March 27, 1962  J. R. CLIFTON ET AL  3,026,850
FAIL-SAFE CONTROL FOR FLUID PRESSURE ACTUATORS
Filed July 17, 1959  2 Sheets-Sheet 1

JOHN R. CLIFTON
AULDIN D. NOLAN
INVENTORS

BY William E. Martin
AGENT

JOHN R. CLIFTON
AULDIN D. NOLAN
INVENTORS

BY William E. Martin
AGENT

United States Patent Office 3,026,850
Patented Mar. 27, 1962

3,026,850
FAIL-SAFE CONTROL FOR FLUID
PRESSURE ACTUATORS
John R. Clifton, Rolling Hills, and Auldin D. Nolan,
Palos Verdes Estates, Calif., assignors to Coleman Engineering Company, Inc., Torrance, Calif., a corporation of California
Filed July 17, 1959, Ser. No. 827,944
3 Claims. (Cl. 121—40)

The present invention relates to an improvement in fluid pressure operated jacks, and more specifically to a novel construction for a hydraulic or pneumatic jack that will positively and automatically lock itself in position in the event of fluid pressure failure.

The many advantages of fluid pressure as a means for developing large forces and precisely controlled motions are well known to those skilled in the art. A commonly used device for applying these advantages in the various mechanical arts is the hydraulic jack, in which force developed by the action of fluid pressure against the face of a piston slidably mounted in a closely fitted cylinder is transmitted through a compression or tension member, generally in the form of a rod rigidly attached to the piston, to the point where application of the force is required. In order to meet the requirements of specific applications, fluid pressure operated jacks of this type may be constructed in a great variety of sizes and physical configurations for operation at high mechanical efficiency. Hydraulic presses for the compression or forming of materials, jacks for raising heavy objects, linear actuators for the operation of aircraft landing gear, flaps and other auxiliaries, and control elements for a variety of heavy machinery, for example, are common examples of the many applications to which the hydraulic jack is almost ideally suited. In all of these applications, however, the fact that failure of the fluid pressure source or leakage from any of the several conduits, unions, seals or valves required in an operative hydraulic or pneumatic system will result in failure to develop the required force and possible collapse of the jack under the influence of applied load, constitutes a significant disadvantage. Because of this inherent drawback, many systems making use of fluid pressure actuators depend on auxilliary latching devices to provide a positive mechanical lock therefor at one or both of their extremes of motion. Such latches, which may be operated by hydraulic, electric or mechanical means, introduce additional complexity, are in themselves subject to failure or malfunction, and generally are ineffective to provide a positive lock or prevent collapse if failure of the fluid pressure occurs when the actuator is in transition from one extreme of travel to the other. It is, therefore, an object of the present invention to overcome this disadvantage inherent in hydraulic jacking devices and similar fluid pressure operated actuators by providing a unique construction whereby the piston and piston rod become automatically locked in position in the event of failure of the fluid pressure source. A second object of the invention is to provide a fail-safe construction of this type which permits the actuator to be extended or retracted either in the direction of or in opposition to an applied load by mechanical means independent of the source of fluid pressure. A third object of the invention is to provide a fail-safe actuator that may be operated manually or by a suitable motor driven source of hydraulic power. A fourth object of the invention is to provide a unique and efficient means for synchronizing the motion and force applied by a plurality of separate actuators. Further objects of the invention will be made apparent to those skilled in the art by the following specification and claims, reference being had to the accompanying drawings wherein two embodiments of the invention are clearly shown.

The invention may be more clearly understood by reference to the drawings, which are to be regarded as merely illustrative and in which like elements are designated by like reference characters. In the drawings.

In order to achieve the several objects hereinbefore set forth, the invention makes use of the cooperative action of a single-acting fluid pressure operated jack and an irreversible, or non-overhauling, screw jack combined therewith in a single actuator. The former includes a cylindrical casing closed at one end to afford means for the application of fluid pressure to one face of a piston slidably mounted therein, the cylinder and piston kinematically comprising the two elements of a sliding pair; and the latter, comprising a corresponding screw pair, includes a shaft threadedly engaging a cooperative nut, each of these elements being operatively connected to one element of the former. Kinematically, the two pairs are so linked as to provide mutual restraint for each other.

In operation, a load applied to the actuator is transmitted through the mating threads of the screw and nut, giving rise to a high bearing friction which opposes relative rotation therebetween. On application of fluid pressure, the force developed between the piston and cylinder head simultaneously opposes the applied load and relieves the bearing load between the two members of the screw jack, thus permitting the threaded shaft of the latter to be rotated with negligible frictional opposition by means of an appropriate source of torque operatively connected thereto. In the event of fluid pressure failure, the load path is automatically returned to the mating threads of the screw jack, which, by virtue of their relatively fine pitch, provide a positive lock against collapse of the actuator.

In the preferred embodiments of the invention, the screw jack and pressure operated jack are arranged so that they are mutually coaxial and coextensive; alternate arrangements embodying the spirit of the invention, however, will be readily apparent to those skilled in the art.

Figure 1:
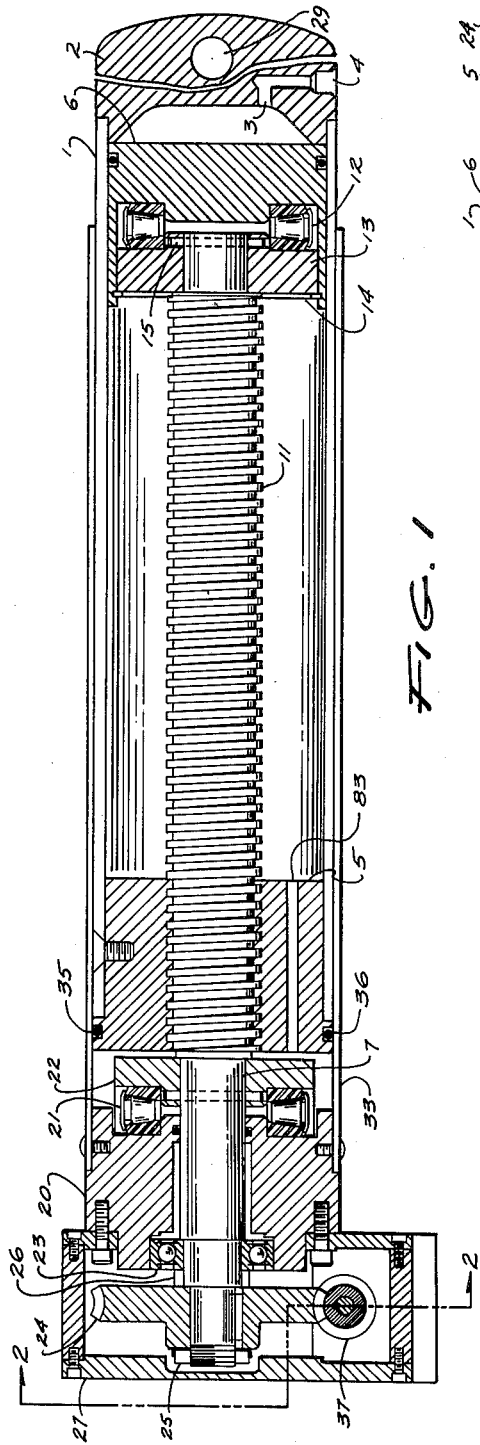
FIGURE 1 is a longitudinal section through a power operated hydraulic actuator embodying the principles of the invention.

Referring now to the drawings, the construction and operation of the invention and the preferred methods of practicing it will be described in detail. In FIGURE 1, the reference numeral 1 designates the cylinder of a hydraulic actuator having a piston 6 slidably mounted therein, the cylinder being closed at one end by a cylinder head 2. The latter is provided with a suitable port 3 for the admission of fluid under pressure through a tubular fitting 4, which may be connected by suitable conduits and valves to a source of hydraulic or pneumatic power in a manner that will be further described hereinafter. The other end of the cylindrical casing 1 is closed by a cylindrical nut 5 having an internally threaded axial bore adapted to engage corresponding external threads 11 on a rotatable shaft 7. The latter is journaled at one end in the piston 6 for free rotation relative thereto, and at the opposite end in a bearing block 20, which may be pivotally supported in appropriate external structure to resist axial loads transmitted by the shaft.

The shaft 7 is preferably journaled at both ends by means of anti-friction bearings as shown. The bearing 12, which is preferably a roller bearing having raceways adapted primarily for the accommodation of axial loads, is retained in a recessed bore in the rear face of the piston by suitable means such as the snap-ring 14 and coupled to the shaft 7 by means of a thrust collar 13, which is keyed for rotation therewith by means of a radial pin 15. At its other end, the shaft 7 is journaled in a similar roller thrust bearing 21 fitted into a bore in the block 20 and coupled to the shaft by means of a second thrust collar 22 bearing against a peripheral shoulder formed in the outer surface of the shaft. The shaft 7 extends through an axial bore in the block 20 and is fitted with a gear 24 retained by a nut 25 threaded to the end of the shaft and axially spaced from a third bearing 23 by means of a cylindrical collar 26. The bearing 23, which is preferably a ball bearing having raceways adapted primarily to accommodate radial loads, is retained in a bore in the bearing block 20 by means of the nut 25, the collar 26 and the gear 24. The latter is housed in an enclosed case 27, fixedly attached to the block 20 and preferably packed with suitable lubricant, and engages a worm 37 driven by a rotary hydraulic motor 38.

Figure 2:
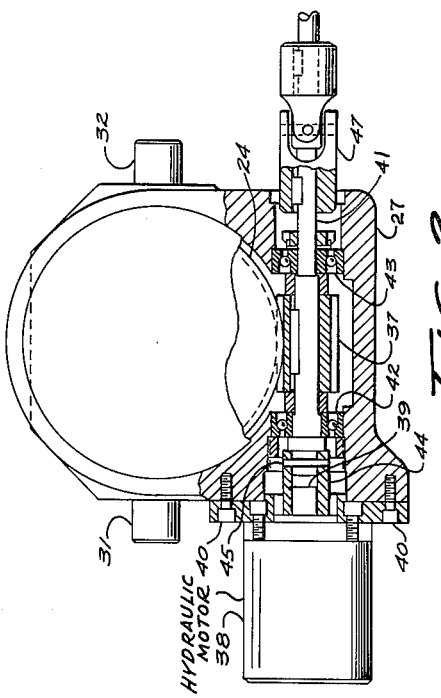
FIGURE 2 is a view taken along the line 2—2 of FIGURE 1.

Referring now to FIGURE 2, a worm 37 mounted on a shaft 41 journaled at each end in bearings 42 and 43, is coupled by means of a cylindrical collar 44 to the shaft 39 of the rotary hydraulic motor 38, the latter being fixedly attached to the gear housing 27 by appropriate means, such as the bolts 40. In the embodiment shown in the drawing, the collar 44 is coupled to the worm shaft 41 for rotation therewith by means of a radial pin 45, and to the shaft of the hydraulic motor by means of a standard key engaging corresponding keyways provided in the shaft and collar. In certain practices of the invention to be described hereinafter, specifically where it is desired to synchronize the action of two or more actuators, the opposite end of the shaft 41 may be extended through the wall of the gear housing and fitted with suitable torque transmission means such as the universal joint 47.

Preferably, the actuator may be provided with pivotal mounting and load transmission means, thereby to facilitate its use between a fixed support structure and a relatively movable load. In the embodiment shown in FIGURE 1, for example, a transverse bore 29 is provided in the cylinder head 2, the bore being adapted to receive a journal of corresponding size attached to the movable load, and the bearing block 20 is provided with trunnions 31 and 32 projecting laterally therefrom and adapted to be journaled about an axis parallel to that of the bore 29.

In order to protect the exposed portion of the threads 11 from dirt, corrosion or accidental damage, a tubular cover 33 may be attached to the bearing block 20 so as to extend axially therefrom and form a sliding fit with the outer surface of the cylindrical casing 1. In certain practices of the invention to be described hereinafter it is desirable to use the space between the piston 6 and the bearing block 20 as a fluid reservoir, and in such cases the adjacent surfaces of the tubular cover and the cylindrical case may be provided with appropriate sealing means, such as the O-ring seal 35, which is retained in a peripheral groove 36 of the nut 5. Where the use of this space as a fluid reservoir is not contemplated, however, it is to be understood that alternate types of protective cover may be used, or, where the operational environment is such that no precaution need be taken against fouling or corrosion of the threads, the cover may be completely omitted.

Figure 5:
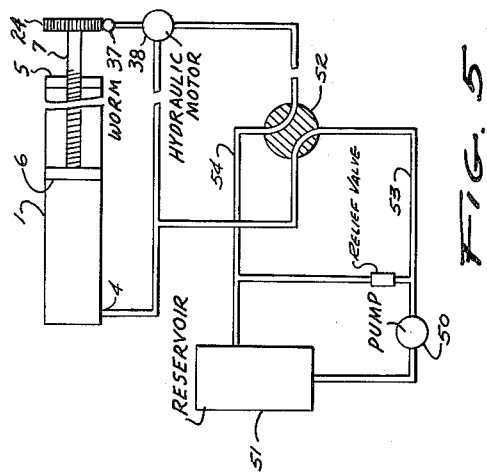
FIGURE 5 is a simplified schematic drawing illustrating the manner in which the embodiment of the invention illustrated in FIGURE 1 may be incorporated into a powered hydraulic system.

The operation of a hydraulic actuator embodying the teachings of the invention will now be explained with reference to the hydraulic system schematic diagram presented in FIGURE 5. In the following discussion it should be borne in mind that the load to be moved by the actuator imposes an axial compressive stress between the bore 29 and the supporting trunnions 31 and 32.

Hydraulic fluid is drawn by the pump 50 from the reservoir 51 and delivered under pressure to the control valve 52. In order to extend the actuator, the hydraulic fluid delivered under pressure from the pump is directed by the valve 52 to the reversible hydraulic motor 38 so as to cause the latter to develop a torque tending to rotate the shaft 7 in the direction necessary to advance the nut 5 and thereby extend the actuator. As the compressive load opposed by the actuator is carried through the cylindrical casing 1 to the nut 5 and thence through the shaft 7 and bearing block 20 to the trunnions 31 and 32 journaled in the supporting structure, a high axial bearing pressure exists between the mating threads of the nut and the shaft, and the torque required to rotate the latter is proportional to the friction prevailing between the thread surfaces. At the same time, however, the fluid pressure developed by the pump 50 is applied through the port 3 to the space between the cylinder head 2 and the piston 6, thus giving rise to a force tending to extend the actuator and hence to relieve the bearing pressure between the mating threads of the nut and shaft. As the hydraulic force developed between the piston and cylinder head approaches the magnitude of the applied load, therefore, the bearing friction between the mating threads falls to a minimum and the shaft 7 is free to rotate in response to the torque developed by the hydraulic motor 38, thereby advancing the nut 5 and extending the actuator. Thus, in effect, the actuator functions as a single acting hydraulic jack with an automatic screw follow-up mechanism.

In order to achieve automatic locking in the event of fluid pressure failure, it is important that the train of relatively rotating elements including the worm 37, the gear 24, the shaft 7 and the nut 5 must comprise an irreversible, or non-overhauling, kinematic chain. That is, while a torque applied to the worm 37 must be capable of causing a translation of the nut 5 in opposition to an applied load, the converse action, application of an axial force to the nut 5, must not result in a rotation of the worm 37. In the present invention this condition is satisfied through the use of a translating thread on the nut 5 and the shaft 7 having a pitch or helix angle substantially less than the angle of kinetic friction prevailing between the mating thread surfaces.

In order to retract the actuator, the fluid-filled space between the piston and cylinder head is placed in communication with the return conduit 54 to the fluid reservoir 51, and the direction of the torque developed by the hydraulic motor is reversed so as to cause the nut 5 to be withdrawn toward the bearing block 20. In the arrangement shown schematically in FIGURE 5, for example, both of these actions are effected simultaneously by reversing the fluid pressure to the hydraulic motor through the control valve 52. In this mode of operation, the actuator functions as a conventional screw jack driven by a hydraulic motor.

Figure 4:
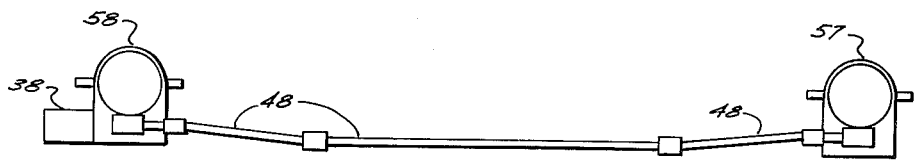
FIGURE 4 is a partially schematic drawing illustrating a method of synchronizing a plurality of actuators according to the present invention.

In addition to the advantages of automatic locking in the event of fluid pressure failure, the present invention is particularly adapted to use in applications where it is desirable to synchronize or otherwise coordinate the motion of two or more actuators. Referring to FIGURES 2 and 4, for example, the worm shaft 41 of a first actuator may be extended to accommodate means for transmitting the hydraulic motor torque and rotation to one or more additional actuators. In the embodiment shown, the torque transmission means includes a universally jointed shaft 48 coupling the worm shafts of two actuators, 57 and 58, the latter including a hydraulic motor 38 which supplies torque for both. Thus, since the motion of each actuator is governed solely by the rotation of its associated screw, both actuators are constrained to move in unison despite differences in the loads applied to each or in the resistance to flow through their respective hydraulic conduits. Plural actuators synchronized by this means may be used to advantage in such applications as the retraction and extension of aircraft landing gear and flaps. It is to be understood, however, that the coordination of plural actuators according to the present invention is not limited only to those applications where synchronous motion is required. It is contemplated, for example, that the worm shafts of respective actuators may be coupled by a geared or equivalent form of drive train which may incorporate a reduction or multiplication ratio affording proportional, rather than synchronous, control of the actuator displacements; thus, a second actuator may be constrained to move, for example, at one third or twice the speed of a first by appropriate selection of the reduction or multiplication ratio provided by the torque transmission between the two actuators. The many applications in which this feature of the invention may be usefully applied will be readily apparent to those skilled in the various mechanical arts.

Figure 3:
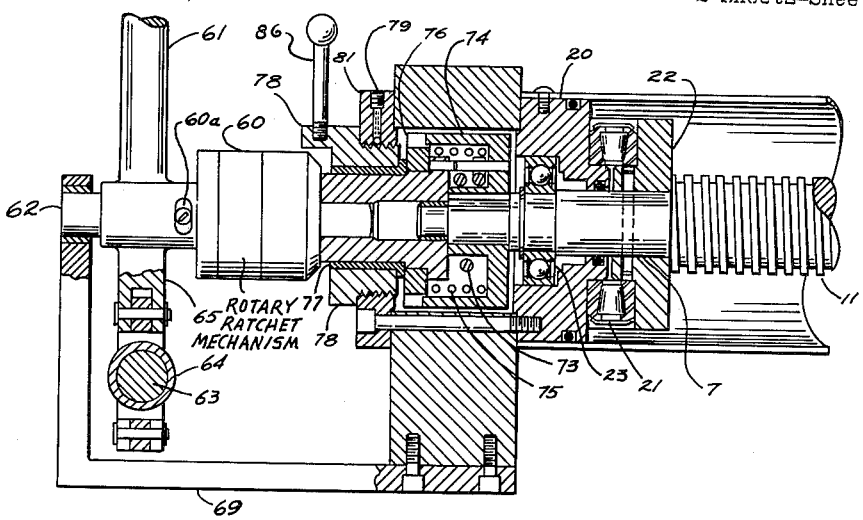
FIGURE 3 is a longitudinal section of a manually operated actuator utilizing principles similar to those of the embodiment shown in FIGURE 1.
Figure 6:
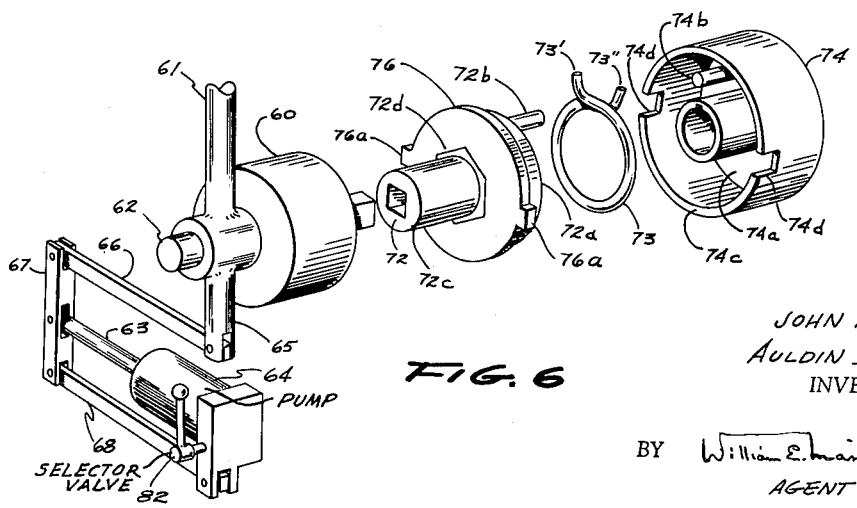
FIGURE 6 is an exploded view illustrating the relation between certain elements of the embodiment shown in FIGURE 3.

Referring now to FIGURES 3 and 6, a second embodiment of the invention specifically adapted for manual operation will be described. FIGURE 3 is a longitudinal section illustrating the driving elements of a mechanically operated actuator, it being understood that the driven elements, including the cylindrical casing, cylinder head, piston, screw and associated seals, fittings and bearings are substantially identical to those of the fully powered embodiment hereinbefore described; and FIGURE 6 is an exploded view further illustrating the relation between certain elements of the manually operated driving mechanism.

In the drawings, the numeral 62 denotes the input shaft of a reversible ratchet mechanism 60, which may be of the type commonly used in conjunction with small hand tools such as socket wrenches and the like, the shaft being journaled at one end in a frame member 69. A handle 61 is attached to the shaft 62 for reciprocal rotation thereof and for imparting reciprocal motion to the piston rod 63 of a hydraulic pump 64, the latter action being effected by means of a lever 65 extending radially from the shaft 62 so as to actuate the pivotally connected linkage comprising the members 66, 67 and 68. The reciprocal rotation imparted to the shaft 62 is converted by the ratchet mechanism 60 to an intermittent, unidirectional rotation which, in turn, is imparted to a first crank member 72 operatively engaging the square output shaft of the ratchet. The crank 72 comprises a terminal disk, or web, 72a having an eccentrically located pin 72b projecting therefrom, a cylindrical journal 72c and an intermediate shank 72d of hexagonal cross section. A cooperative second crank member 74 is keyed to the shaft 7 for rotation therewith, the terminal portion of said shaft being journaled in an axial recess in the crank 72. The second crank member 74 includes a circular web 74a having an eccentrically located pin 74b projecting from one face thereof, the latter being adapted to cooperate with the pin 72b in a manner to be described hereinafter, and a cylindrical flange 74c having a pair of diametrically spaced recesses 74d adapted to receive a pair of correspondingly positioned teeth 76a projecting from a clutch disk 76 slidably mounted on the hexagonal shank 72d, the disk 76 and the flange 74c being normally urged apart by a helical compression spring 75. An annular torsion spring 73 is housed in the axial space between the two crank webs, 72a and 74a, and provided with a pair of radial extensions 73' and 73", the latter being displaced from each other by a sufficient angle to allow the two crank pins 72b and 74b to be disposed in side by side relation therebetween.

A thrust collar 77 is slidably mounted on the crank journal 72c so as to bear against the clutch disc 76. The thrust collar, in turn, is carried by a control ring 78 which threadedly engages a cooperative nut 81 fixed to the bearing block 20, the threads of the respective members being of relatively high pitch so as to afford substantial axial movement of the control ring in response to a relatively small radial movement thereof. A handle 86 is provided for rotation of the control ring, and a detent mechanism 79, comprising a ball confined in a radial bore of the nut 81 and urged by a compression spring into cooperative recesses in the periphery of the control ring, affords positive location of the relatively movable members for purposes to be explained hereinafter.

The reciprocating hydraulic pump is provided with a selector valve 82 for controlling the flow of hydraulic fluid to and from the cylinder head port 3 the pressure outlet port of said valve being connected with the cylinder head port by means of a flexible conduit (not shown). A pressure relief valve is provided integral with the pump itself and may be set for the maximum pressure at which operation of the actuator is anticipated. In the preferred practice of the invention, the space between the piston 6 and the bearing block 20 is used as a reservoir for the fluid supplied to the pump, and for this purpose a bore 83 is provided in the nut 5 to permit free passage of fluid therethrough, and a port, adapted to receive a second flexible conduit (not shown) for communication with the hydraulic pump inlet, is provided in the outer casing 33 adjacent the juncture thereof with the bearing block 20.

The operation of the manual embodiment of the invention, which will now be described, is closely analagous to that of the fully powered embodiment. In order to extend the actuator against an opposing load, the cylinder head space is placed in communication with the outlet port of the hydraulic pump by means of the selector valve 82, and the operating handle is manually reciprocated. In response to the first stroke of the handle, which may be considered a "forward" stroke, fluid pressure is applied to the face of the piston 6, tending to relieve the axial bearing friction between the nut and shaft, and a torque tending to rotate the shaft so as to advance the nut and extend the actuator is applied through the torsional coupling comprising the two cranks 72 and 74 and the annular torsion spring 73. If the two forces are jointly sufficient to overcome the applied load, the actuator will be extended thereby, the increment of extension substantially corresponding to the volume displaced by the pump. If the torque and hydraulic pressure are jointly insufficient to overcome the applied load, on the next stroke of the handle, which may be considered a "back" stroke, the applied torque will be released by the action of the torsion spring on the ratchet mechanism, and the pump chamber will be refilled in preparation for a new cycle. On the first stroke of the new cycle, the torque tending to rotate the shaft will be restored and the pressure developed by the pump increased. This action will continue with successive cycles until the pressure and torque delivered during each forward stroke of the handle are jointly sufficient to extend the actuator by one increment. Thus the actuator functions essentially as a screw jack in which hydraulic augmentation is used to relieve the high axial bearing pressure which would otherwise prevail between the mating threads and give rise to correspondingly high frictional power losses.

Retraction of the actuator is accomplished, as in the case of the fully powered embodiment, solely by the action of the threaded shaft and nut without the assistance or augmentation of hydraulic pressure. The cylinder head space is placed in communication with the inlet port of the hydraulic pump by means of the selector valve 82, and the ratchet mechanism is adjusted by means of the external control 60a provided therefor so as to convert the reciprocal motion of the handle to an intermittent rotation of the crank 72 in the direction necessary to withdraw the nut 5 toward the base of the shaft 7.

In this mode of operation the crank pin 72b bears directly against the crank pin 74b so as to provide direct transmission of torque therebetween, the annular torsion spring 73 being idly rotated therewith. On each "back" stroke, therefore, the shaft 7 will be rotated by an increment equal to the angular motion of the handle, and the actuator will be retracted by a linear increment corresponding to the product of that angle and the pitch of the threads 11. On each "forward" stroke, hydraulic fluid withdrawn from the cylinder head space will be returned to the reservoir by the pump, and the ratchet mechanism will overrun in preparation for the next cycle.

From the foregoing discussion it will be apparent that, though the irreversible character of the screw jack provides positive locking against collapse, the limited travel of the operating handle, acting through the torsion spring coupling described, will not permit manual extension of the actuator in the event of hydraulic pressure failure. In order to render the jack fully operative in such circumstances, therefore, the slidably mounted clutch disk 76 may be axially displaced toward the crank 74 so that the teeth 76a of the former are engaged by the corresponding recesses 74d of the latter. The handle 86 attached to the control ring 78 affords means for rotation thereof so as to advance the thrust collar 77 and thereby urge the dentate periphery of the clutch disk 76 into engagement with the cooperative flange of the crank 74 against the opposition of the intervening compression spring. Thus the crank 74 and the disk 76, which is keyed for rotation with the crank 72 by means of the hexagonal shank 72d, effectively act as two members of a dog clutch, thereby affording positive transmission of torque from the ratchet 60 to the screw shaft 7 and rendering the torsionally resilient transmission normally provided by the two crank pins and annular torsion spring inactive. Disengagement of the clutch may be effected by opposite rotation of the handle 86, the helical compression spring 75 serving to urge the two members apart. The positions of the handle 86 which correspond to positive engagement and positive disengagement of the dentate portions of the two clutch members may be positively located by means of the detent mechanism 79 hereinbefore described.

An important feature of the invention is the manner in which working parts of the mechanism are completely lubricated by surrounding lubricant. This feature may be understood when it is considered that the nut 5 in effect divides an elongated chamber into two compartments. One compartment contains the piston 6 and it is in this compartment that hydraulic pressure is effective to carry the applied load. The second compartment is the enclosed space between the nut 5 and the bearing block 20. Both of the compartments contain the hydraulic fluid, the two compartments being in fluid communication with each other through the bore 83 in the nut 5.

The nut 5 is completely immersed in the hydraulic fluid in the elongated chamber, one side of the nut being exposed to the hydraulic fluid in one compartment and the other side of the nut being exposed to the hydraulic fluid in the other compartment. The roller bearing 12 is completely immersed in the hydraulic fluid in one compartment and the second roller bearing 21 is completely immersed in hydraulic fluid in the other compartment.

The power means for causing relative rotation between the piston rod and the nut is connected to the piston rod by transmission means comprising the worm gear 24 and the worm 37. Here again the working parts are surrounded by lubricant since the gear housing 27 which encloses the transmission as well as the third bearing 23 is packed with a suitable lubricant.

Considered in a somewhat different light, FIG. 1 shows a fail-safe single-acting hydraulic jack with a hydraulic reservoir that submerges the rotary parts. The single-acting jack comprises the piston and the cooperating cylinder with a single fluid passage 3 in communication with the cylinder. The hydraulic reservoir that encloses the rotary parts comprises the space between the nut 5 and the piston 6 and the space between the nut 5 and the bearing block 20, these two spaces being in communication with each other through the bore 83 in the nut. As may be seen in FIG. 5, the reservoir is in communication with the pressure chamber of the jack through the hydraulic motor 38.

From the foregoing description it will be readily apparent to those skilled in the art that the present invention teaches a new and useful construction for fluid pressure operated jacks whereby, in the event of fluid pressure failure, positive locking against either collapse or extension under the influence of applied loads is automatically provided, and further characterized by provision for purely mechanical operation as well as for effectively coordinating the movement of a plurality of actuators.

While the embodiments of the invention hereinbefore described comprise preferred forms thereof, it is to be understood that other forms might be adopted and it is our desire to reserve unto ourselves all such alternate forms embodying the teachings of this disclosure and falling within the spirit and scope of the appended claims.

Having thus described our invention in sufficient detail to enable those skilled in the art to practice it successfully, what we claim is:

1. In a jack for lifting a heavy load, the combination of: structure including a cylinder forming an elongated fluid-tight chamber confining a body of hydraulic fluid; a piston in said chamber to cooperate therewith for lifting the load in response to fluid pressure exerted between the piston and the chamber; a nut member inside said chamber completely immersed in said body of hydraulic fluid for complete lubrication thereby, said nut member dividing the chamber into a major compartment and a minor compartment at one end of the chamber with the two compartments in fluid communication with each other, said piston being separate from the nut member for reciprocation relative to the nut member; a piston rod member connected to said piston in said major compartment and extending axially from the piston through said nut member, through said minor compartment and through said one end of the chamber to the exterior of the chamber, said piston rod member having a peripheral screw thread in screw engagement with said nut member, one of said chambers and said piston rod member being anchored and the other of said chambers and said piston rod member being adapted to receive the applied load; means to prevent relative axial movement between said nut and said cylinder; transmission means to rotate one of said two members relative to the other of the two members and relative to said structure that forms the elongated chamber, said transmission means being confined with lubricant and including a worm gear and a worm in mesh therewith; bearing means acting between said one member of the two members and said structure that forms the chamber to minimize the resistance to rotation of said one member of the two members, said bearing means being immersed in said body of hydraulic fluid for lubrication thereby; a fluid motor to actuate said one member of the two members; and power means to create fluid pressure in said chamber to act on said load and to supply fluid under pressure to said fluid motor.

2. In a jack for lifting a heavy load, the combination of: structure including a cylinder forming an elongated fluid-tight chamber confining a body of hydraulic fluid; a piston in said chamber to cooperate therewith for lifting the load in response to fluid pressure exerted between the piston and the chamber; a nut member inside said chamber completely immersed in said body of hydraulic fluid for complete lubrication thereby, said nut member dividing the chamber into a major compartment and a minor compartment at one end of the chamber with the two compartments in fluid communication with each other, said piston being separate from the nut member for reciprocation relative to the nut member; a piston rod member connected to said piston in said major compartment and extending axially from the piston through said nut member, through said minor compartment and through said one end of the chamber to the exterior of the chamber, said piston rod member having a peripheral screw thread in screw engagement with said nut member, one of said chambers and said piston rod member being anchored and the other of said chambers and said piston rod member being adapted to receive the applied load; means to prevent relative axial movement between said nut and said cylinder; power actuated means to rotate one of said two members relative to the other of the two members and relative to the structure forming said chamber; and means to create fluid pressure in said chamber for applying force to said load.

3. In a jack for lifting a heavy load, the combination of: structure including a cylinder forming an elongated fluid-tight chamber confining a body of hydraulic fluid; a piston in said chamber to cooperate therewith for lifting the load in response to fluid pressure exerted between the piston and the chamber; a nut member inside said chamber completely immersed in said body of hydraulic fluid for complete lubrication thereby, said nut member dividing the chamber into a major compartment and a minor compartment at one end of the chamber with the two compartments in fluid communication with each other, said piston being separate from the nut member for reciprocation relative to the nut member; a piston rod member connected to said piston in said major compartment and extending axially from the piston through said nut member, through said minor compartment and through said one end of the chamber to the exterior of the chamber, said piston rod member having a peripheral screw thread in screw engagement with said nut member, one of said chambers and said piston rod member being anchored and the other of said chambers and said piston rod member being adapted to receive the applied load; means to prevent relative axial movement between said nut and said cylinder; transmission means including a worm gear and a worm in mesh therewith to cause relative rotation between said piston rod member and said nut member, said worm gear and worm being enclosed with confined lubricant; a fluid motor to drive said transmission means, said fluid motor being in fluid communication with said chamber; and power means to deliver hydraulic fluid under pressure to said chamber through said fluid motor for creating fluid pressure in the chamber and simultaneously actuating said transmission means.

References Cited in the file of this patent

UNITED STATES PATENTS

| | | |
|---|---|---|
| 1,182,967 | Bowser | May 16, 1916 |
| 1,545,963 | Kopf | July 14, 1925 |
| 1,552,011 | Schwerin | Sept. 1, 1925 |
| 1,616,841 | Beebe | Feb. 8, 1927 |
| 1,764,988 | Schwerin | June 17, 1930 |
| 2,394,384 | Horstmann | Feb. 5, 1946 |
| 2,477,108 | Young | July 26, 1949 |
| 2,892,311 | Van Gerpen | June 30, 1959 |

FOREIGN PATENTS

| | | |
|---|---|---|
| 288,754 | Great Britain | Apr. 19, 1928 |
| 405,361 | Italy | Aug. 9, 1943 |